United States Patent Office 3,379,679
Patented Apr. 23, 1968

3,379,679
STABILIZING COMPOSITIONS
Michael M. Besso, New London, Conn., assignor to Chas. Pfizer & Co., Inc., New York, N.Y., a corporation of Delaware
No Drawing. Filed July 23, 1965, Ser. No. 474,475
13 Claims. (Cl. 260—45.75)

ABSTRACT OF THE DISCLOSURE

Halogen-containing resins stabilized by a mixture of an organotin maleate and a maleate ester, the molar ratio of maleate ester to organotin maleate being at least 1:1.

---

This invention relates to stabilized plastic compositions. More particularly, it is concerned with heat and light resistant halogen-containing resins stabilized by incorporating therein a stabilizing mixture of an organotin maleate and a maleate ester.

Vinyl halide polymers such as the commercially important polyvinyl chloride and its copolymers are markedly subject to degradation when exposed to heat and light. Such degradation is evidenced by considerable discoloration which may also be accompanied by the development of brittleness and loss of strength. The instability of these resins has been overcome in the art by adding to them certain chemical materials, known as stabilizers. Especially noteworthy and efficient resin stabilizers are organo metallic compounds derived from tin. Special mention is made of organotin maleate esters which have been found to impart exceptional stability to halogen-containing resins against the deteriorative effects of heat and light.

While such stabilizers have been employed independently in the heat and light stable compositions developed in the art, it has now been found that using them in conjunction with certain maleate esters, in similar plastic compositions, provides a truly remarkable synergistic effect. Thus, it is observed that the stability of halogen-containing resins is improved by incorporating therein mixtures of said known organotin stabilizers with said maleate esters which provide properties more useful than those stabilized with equal amounts of the organotin compounds separately. Even more remarkable is the fact that said maleate esters, by themselves, are not stabilizing compounds whereas in combination with said organotin compounds, enhance the stabilizing effect of said organotin compounds to a substantial degree. Still further, this discovery provides economic advantages to resin compounders, who may decrease the amount of more expensive organotin compound in the overall composition while still obtaining equivalent or better stability.

It is, accordingly, a principal object of the instant invention to provide improved plastic compositions.

It is a further object of the instant invention to provide plastic compositions with improved resistance to heat and light.

It is still a further object of the instant invention to provide stabilized halogen-containing resin compositions more economically than heretofore.

These and other objects will become readily apparent to those skilled in the art.

The novel plastic compositions of this invention which are effectively stabilized against heat and light comprise as an essential constituent a halogen-containing resin, an organotin maleate of the formula:

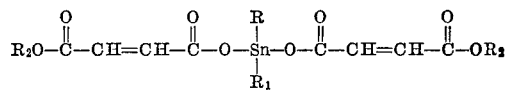

and at least an equimolar amount of a maleate ester of the formula

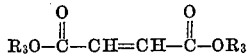

wherein R, $R_1$ and $R_2$ are each selected from the group consisting of alkyl and alkenyl of up to 12 carbon atoms, and aryl, alkaryl and aralkyl of from 6 to 9 carbon atoms; and $R_3$ is selected from the group consisting of hydrogen, alkyl and alkenyl of up to 12 carbon atoms, and aryl, alkaryl and aralkyl of from about 6 to 9 carbon atoms, provided that one of said $R_3$ is other than hydrogen.

The halogen-containing resins contemplated by the instant invention include those containing a plurality of vinyl chloride units such as polymers of vinyl chloride and conjoint polymers of vinyl chloride with another polymerizable compound, for example, copolymers of vinyl chloride with esters of acrylic and methacrylic acids, and with acrylonitrile; copolymers of vinyl chloride with vinyl esters of aliphatic acids, particularly vinyl acetate; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; copolymers of vinyl chloride and vinylidene chloride with unsaturated aldehydes, ketones and others, such as acrolein, crotonaldehyde, methyl vinyl ketone, methyl vinyl ether, isobutyl vinyl ether, and the like; polymers of vinylidene chloride and copolymers of the same with vinyl chloride and other polymerizable compounds; polymers of vinyl chloroacetate and dichlorodivinyl ether; chlorinated polymers of vinyl acetate; chlorinated polymeric esters of acrylic and alpha-substituted acrylic acids; polymers of chlorinated styrenes, for example, dichlorostyrene; chlorinated rubber; chlorinated polymers of ethylene; polymers and after-chlorinated polymers of chlorobutadienes, and their copolymers with vinyl chloride, rubber hydrochloride and chlorinated rubber hydrochloride; and mixtures of the polymers recited herein with each other or other polymerizable compounds. The corresponding bromides and fluorides lend themselves equally well to the preparation of the valuable new plastics compositions.

Particularly effective stabilizing mixtures consist of those wherein said organotin maleate is a dibutyltin derivative, i.e., where R and $R_1$ are n-butyl, having the formula

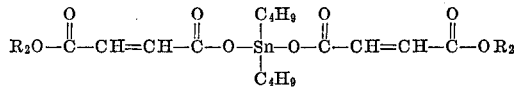

wherein $R_2$ is as defined earlier, and said maleate ester is a mono-maleate ester of the formula

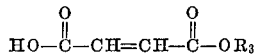

wherein $R_3$ is as defined earlier. In this regard, especially useful compounds are those wherein $R_3$ is methyl.

The aforesaid organotin maleates are well-documented compounds and are generally readily available commercially; however, if necessary, can be made by techniques familiar to those skilled in the art. In this connection, reference is made to Smith, "Organotin Stabilizers," Tin Research Institute, Middlesex, England, 1959, especially pp. 5–6, which provides reference to methods for preparing the aforesaid organotin compounds and intermediates thereof.

Concerning the maleate esters, these compounds may be prepared by straight-forward esterification procedures in which the starting material is preferably maleic anhydride, although maleic acid may also be used. Naturally, the formation of mono- or di-ester is dependent on the amount of esterifying alcohol utilized.

In addition to the novel stabilized plastic compositions set forth hereinabove, the instant invention also contemplates novel stabilizing mixtures comprising an organotin maleate and at least an equimolar amount of a maleate ester, said organotin maleate being a substance of the formula

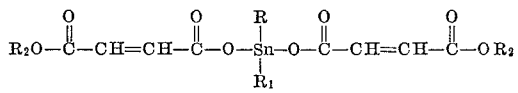

said maleate ester having the formula

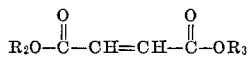

wherein R, $R_1$, $R_2$ and $R_3$ are as defined hereinabove. Illustrative of such stabilizing mixtures are:

dibutyltin bis-methyl maleate—mono-methyl maleate
dioctyltin bis-methyl maleate—mono-2-ethylhexyl maleate
diphenyltin bis-allyl maleate—mono-allyl maleate Similarly, particularly effective mixtures are those in which said organotin compound is a dibutyl-tin derivative and said maleate ester is a mono-ester, especially the mono-methyl ester. It is found that in order to attain the stabilizing enhancement of such mixtures, it is necessary to have at least an equimolar amount of said maleate ester with respect to said organotin compound. More particularly preferred are mixtures wherein the mole-ratio of said organotin maleate to said maleate ester is from about 1:1.5 to about 1:4. Essentially, the basis for the aforementioned stabilizing enhancement relates to the ratio of tin derived from the organotin compound to the double bond character provided by the maleate ester. It follows, therefore, that it is desirable to incorporate as much maleate component as possible, while still providing better or at least equivalent stabilizing properties when compared to the organotin compound by itself. Said desirability is based on cost analysis. In this regard, there is an upper limit for the amount of maleate ester which can be incorporated, beyond which, no stabilizing enhancement is observed. For most mixtures, this upper limit is approximately a 5 mole excess of said maleate ester.

With regard to these stabilizing mixtures and to plastic compositions incorporating said mixtures, it is generally found that the addition of up to about 10% by weight of an anti-oxidant is beneficial. This of course, is a modification well-known to those trained in the art and is generally used in preparing stabilized plastic compositions.

The following examples are given by way of illustration and are not to be construed as limitations of this invention many variations of which are possible without departing from the spirit or scope thereof.

Example I

A plastic composition is prepared containing the following ingredients in parts by weight:

| Composition | Number of moles | Parts by weight |
|---|---|---|
| A. Polyvinylchloride | | 100 |
| Stabilizer (includes antioxidant) | | 2–3 |
| Dibutyltin bis-methyl maleate | 1 | |
| Mono-methyl maleate | 1.5 | |
| Lubricant, stearic acid | | 0.5–1.0 |

The ingredients are mixed together, then compounded on a plastic mill for 4 minutes at 171° C. The hot batches are sheeted off at a thickness of about 0.050 inches and samples are prepared.

Example II

Plastic compositions (PVC) are prepared having the same composition as described in Example I, i.e. on a parts by weight basis, except the following stabilizing mixtures are substituted having the following mole-ratio of organotin maleate to maleate ester:

| Stabilizer | Mole-ratio | Percent Sn |
|---|---|---|
| B. Dibutyltin bis-methyl maleate mono-methyl maleate | ½ | 15.85 |
| C. Dibutyltin bis-methyl maleate mono-methyl maleate | ⅓ | 12.9 |
| D. Dibutyltin bis-methyl maleate mono-methyl maleate | ¼ | 11.2 |
| E. Dibutyltin bis-2-ethylhexyl maleate mono-methyl maleate | ½ | 12.0 |
| F. Dibutyltin bis-2-ethylhexyl maleate mono-methyl maleate | ¼ | 10.55 |
| G. Dibutyltin bis-allyl maleate mono-methyl maleate | ½ | 12.2 |
| H. Dibutyltin bis-allyl maleate mono-methyl maleate | ¼ | 10.7 |
| I. Dibutyltin bis-2-ethylhexyl maleate mono-allyl maleate | ½ | 11.35 |
| J. Dibutyltin bis-methyl maleate | | 23.8 |

Example III

The prepared samples of the plastic compositions outlined in Examples I and II designated as formulations A–I are subjected to a static heat stability test wherein the color of the samples is observed when they are taken off the mill initially and after heating at 185° C. for 25 minutes in a circulating air oven. Comparison is made with a standard, i.e. dibutyltin bis-methyl maleate, and the following results are obtained.

| Composition | Initial Color | Initial Clarity | 185° C., 25 min., Color |
|---|---|---|---|
| A | 1̄ | 1̄ | 1 |
| B | 1̄ | 1̄ | 1 |
| C | 1̄ | 1̄ | 1 |
| D | 1̄ | 1̄ | 1 |
| E | 1̄ | 1̄ | 1̄ |
| F | 1̄ | 1̄ | 1̄ |
| G | 1̄ | 1̄ | 1 |
| H | 1̄ | 1̄ | 1 |
| I | 1̄ | 1 | 2 |
| J. Standard | 1 | 1 | 1 |

The standard has a rating of 1 in all categories. Superior or better performance is indicated by a dash line (or lines) over the number, for instance, 1̄ indicates noticeably better and 1̿ considerably better performance than the standard. Further, the following numerical rating is used:

(1) Performance equal to standard
(2) Slightly poorer than standard
(3) Moderately worse than standard The above results demonstrate that the novel mixtures of the instant invention when incorporated into PVC plastic formulations provide equivalent or better stabilizing properties than similar plastic formulations containing equivalent amounts of organotin maleate alone. This is particularly surprising in light of the fact that said mixtures have tin levels which are significantly lower than the tin level of standard, dibutyltin bis-methyl maleate.

Example IV

The stabilizing mixtures enumerated in Examples I and II are formulated in a similar manner into plasticized clear and filled PVC formulations and subjected to the heat stability test outlined in Example III and comparable results are obtained.

EXAMPLE V

The stabilizing mixtures described in Examples I and II are formulated in a similar manner into a non-plasticized vinyl chloride-vinyl acetate (90%:10%) copolymer and subjected to the heat stability outlined in Example III. Substantially the same results are obtained.

EXAMPLE VI

The procedure of Example III is repeated substituting for the vinyl chloride resin the following hologenated hydrocarbon resins, including copolymers of vinyl chloride:

vinyl cloride 2-ethylhexyl acrylate copolymer (80:20)
vinyl chloride-vinylidene chloride copolymer (90:10)
vinyl chloride-acrylonitrile copolymer (90:10)
polychlorobutadiene
chlorinated polyethylene
polydichlorostyrene
chlorinated rubber It is found that compositions with better stability to heat and light are obtained with the novel mixtures described herein than are obtained with the organotin maleate compounds alone.

EXAMPLE VII

Compositions with stability to heat and light equivalent or better than that obtainable with equal amounts of organotin maleate compound alone are obtained by adding to polyvinyl chloride about 0.5 to 10 parts by weight of mixtures of the following components, I and II, the mixture containing for each mole of the organotin maleate (I) from an equimolar amount to a four molar excess of maleate ester (II).

(I) 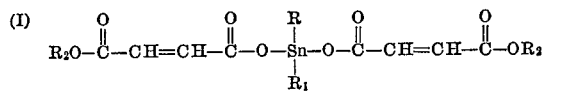

| R | $R_1$ | $R_2$ |
|---|---|---|
| $CH_3$ | $CH_3$ | $CH_2(CH_2)_{10}CH_3$ |
| $C_2H_5$ | $C_2H_5$ | $C_6H_5$ |
| isobutyl | isobutyl | $C_6H_3(CH_3)_2$ |
| n-$C_4H_9$ | n-$C_4H_9$ | $CH_2CH=CHCH_3$ |
| $CH_2C_6H_5$ | $CH_2C_6H_5$ | dodecenyl |
| n-$C_4H_9$ | n-$C_4H_9$ | 2-ethylhexyl |
| n-$C_4H_9$ | n-$C_4H_9$ | $CH_2-CH=CH_2$ |
| n-$C_4H_9$ | n-$C_4H_9$ | $CH_3$ |
| n-$C_4H_9$ | n-$C_4H_9$ | $CH_2CH_2C_6H_5$ |
| n-$C_4H_9$ | n-$C_4H_9$ | $C_6H$ ($CH_3$) |
| n-$C_4H_9$ | n-$C_4H_9$ | $CH_2(CH_2)_4CH_3$ |
| n-$C_4H_9$ | n-$C_4H_9$ | n-$C_4H_9$ |
| $CH_2(CH_2)_{10}CH_3$ | $CH_2(CH_2)_{10}CH_3$ | $CH_2-CH=CH_2$ |
| $CH_2CH=CHCH_3$ | $CH_2CH=CHCH_3$ | $CH_3$ |
| $CH_2C_6H_4$ | $CH_2C_6H$ | $C_3H_7$ |
| $C_6H_3(CH_3)_2$ | $C_6H_3(CH_3)_2$ | $C_6H_5$ |

(II) 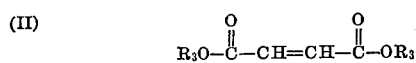

$R_3$ (mono or dimaleates)

| | |
|---|---|
| $CH_3$ | $C_{12}H_{25}$ |
| $C_3H_7$ | $CH_2-CH=CH_2$ |
| isobutyl | $CH_2CH=CHCH_3$ |
| n-$C_4H_9$ | dodecenyl |
| —$C_6H_{13}$ | $C_6H_5$ |
| 2-ethylhexyl | $C_6H_3(CH_3)_2$ |
| $CH_2CH_2C_6H_4$ | $C_6H_2(CH_3)_3$ |
| $CH_2(CH_2)_2C_6H_4$ | $C_6H_4(CH_3)$ |

What is claimed is:

1. Stabilizing mixture comprising an organotin maleate and a maleate ester, said organotin maleoate being a substance of the formula

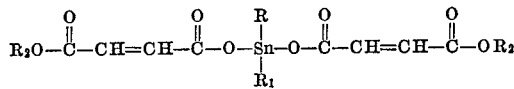

said maleate ester having the formula

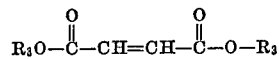

wherein R, $R_1$ and $R_2$ are each selected from the group consisting of alkyl and alkenyl of up to about 12 carbon atoms, and aryl, alkaryl and aralkyl of from about 6 to 9 carbon atoms; and $R_3$ is selected from the group consisting of hydrogen, alkyl and alkenyl of up to about 12 carbon atoms, and aryl, alkaryl and aralkyl of from about 6 to 9 carbon atoms, provided that at least one of said $R_3$ is other than hydrogen, the molar ratio of said organotin maleate to said maleate ester being from 1:1 to about 1:5.

2. A mixture as defined in claim 1 wherein said organotin maleate is dibutyltin bis-methyl maleate and said maleate ester is mono-methyl maleate, the mole-ratio of said organotin maleate to said maleate ester being from about 1:1.5 to about 1:4.

3. A mixture as defined in claim 1 wherein said organotin maleate is dibutyltin bis-2-ethylhexylmaleate and said maleate ester is mono-methyl maleate, the mole-ratio of said organotin maleate to said maleate ester being from about 1:1.5 to about 1:4.

4. A mixture as defined in claim 1 wherein said organotin maleate is dibutyltin bis-methyl maleate and said maleate ester is mono-2-ethylhexyl maleate, the mole-ratio of said organotin maleate to said maleate ester being from about 1:1.5 to about 1:4.

5. A mixture as defined in claim 1 wherein said organotin maleate is dibutyltin bis-allyl maleate and said maleate ester is mono-methyl maleate, the mole-ratio of said organotin maleate to said maleate ester being from about 1:1.5 to about 1:4.

6. A mixture as defined in claim 1 wherein said organotin maleate is dibutyltin bis-methyl maleate and said maleate ester is mono-allyl maleate, the mole-ratio of said organotin maleate to said maleate ester being from about 1:1.5 to about 1:4.

7. A mixture as defined in claim 1 wherein said organotin maleate is dibutyltin bis-2-ethylhexylmaleate and said maleate ester is mono-allyl maleate, the mole-ratio of said organotin maleate to said maleate ester being from about 1:1.5 to about 1:4.

8. A mixture as defined in claim 1 wherein said organotin maleate is dibutyltin bis-allyl maleate and said maleate ester is mono-2-ethylhexyl maleate, the mole-ratio of said organotin maleate to said maleate ester being from about 1:1.5 to about 1:4.

9. A mixture as defined in claim 1 wherein said organotin maleate is dibutyltin bis-2-ethylhexyl maleate and said maleate ester is diallyl maleate, the mole-ratio of said organotin maleate to said maleate ester being from about 1:1.5 to about 1:4.

10. A mixture as defined in claim 1 wherein said organotin maleate is dibutyltin bis-allyl maleate and said maleate ester is di-2-ethylhexyl maleate, the mole ratio of said organotin maleate to said maleate ester being from about 1:1.5 to about 1:4.

11. A plastic composition stabilized against heat and light, including as an essential constituent a resin containing a plurality of vinyl chloride units, an organotin maleate of the formula

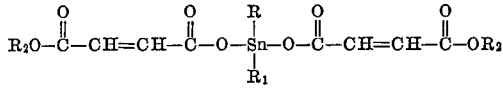

and a maleate ester of the formula

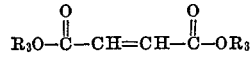

wherein R, $R_1$ and $R_2$ are each selected from the group consisting of alkyl and alkenyl of up to about 12 carbon atoms, and aryl, alkaryl and aralkyl of from about 6 to 9 carbon atoms; and $R_3$ is selected from the group consisting of hydrogen, alkyl and alkenyl of up to about 12 carbont atoms, and aryl, alkaryl and aralkyl of from about 6 to 9 carbon atoms, provided that at least one of said $R_3$ is other than hydrogen, the molar ratio of said organotin maleate to said maleate ester being from 1:1 to about 1:5.

12. The composition of claim 11 wherein the resin is a homopolymer of vinyl chloride.

13. The composition of claim 11 wherein the resin is a copolymer of vinyl chloride.

References Cited

UNITED STATES PATENTS

| | | | |
|---|---|---|---|
| 2,457,035 | 12/1948 | Darby | 260—31.8 |
| 2,954,362 | 9/1960 | Wilson | 260—45.75 |

DONALD E. CZAJA, *Primary Examiner.*

JAMES A. SEIDLECK, *Examiner.*

V. P. HOKE, *Assistant Examiner.*